Aug. 28, 1934.  E. E. GREVE  1,971,713
PUMP VALVE
Filed July 30, 1929

INVENTOR
E. E. Greve
by W. G. Doolittle
Attorney.

Patented Aug. 28, 1934

1,971,713

UNITED STATES PATENT OFFICE 1,971,713

PUMP VALVE

Edgar E. Greve, Bellevue, Pa., assignor, by mesne assignments, to Oil Well Supply Company, Pittsburgh, Pa., a corporation of New Jersey Application July 30, 1929, Serial No. 382,161

8 Claims. (Cl. 251—144)

Pump valves and/or a pump assembly of the type to which the present invention is particularly directed is shown and described in a companion application, Serial No. 381,160, filed July 26, 1929. In the said application as well as in the present case the invention contemplates a pump valve or the like including a valve proper, a valve seat, and a flexible or resilient insert assembled to provide a metal to metal contact and a resilient material and metal contact between the valve and its seat; said insert being of a character and arranged to be subjected to fluid pressure within a valve chamber to effect an efficient sealing of the valve when in closed position.

One object of my invention is to provide a means for effecting an efficient seal between a valve seat member and a valve proper either of which has spaced apart metal to metal contacts by providing an intermediate packing carried by one of said members and arranged to contact the other member, the said packing means being provided with a lateral opening to cause swelling of the packing into sealing contact with the member which it engages. A further and more specific object of my invention is to provide a valve mechanism for pumps and the like including a valve proper, a valve seat member and packing carried by the seat member and arranged to contact the other member, said packing having a lateral groove communicating with a passage for admitting pressure fluid for expanding the packing into sealing contact with the member which it engages. Further objects of my invention will become apparent in the course of the ensuing description and will be more particularly pointed out in the accompanying claims.

Figure 1:
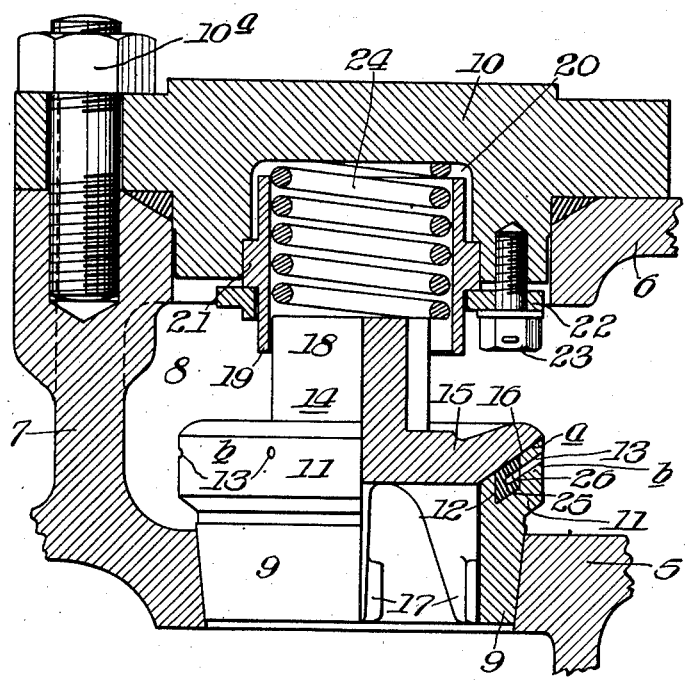
Figure 2:
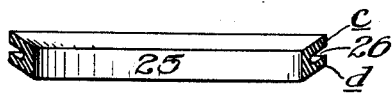

In the accompanying drawing, which illustrates an application of my invention:

Fig. 1 is a vertical sectional view of a valve assembly embodying my invention; and Fig. 2, a detail sectional view, showing a portion of an insert employed.

In the drawing, I have shown the valve assembly embodying my invention in connection with wall portions 5, 6 and 7 of a water cylinder structure having a valve chamber 8 therein. As illustrated, each of the walls 5 and 6 is formed with an opening, the opening of the lower wall 5 being adapted to receive a valve seat 9, and the opening of wall 6 being adapted to receive a depending portion of a closure cap 10, the latter being removably attached to the cylinder casing by bolts and nuts, as at 10a.

The valve seat member 9, which is entered in the opening of the lower wall 5, is of circular form and has an enlarged upper annular portion 11.

The valve proper, designated generally by the numeral 14, comprises an annular portion 15 having an enlarged inclined contacting face 16 for cooperation with the valve seat member 9. The valve seat member 9 and the valve proper 14 cooperate to control flow of fluid through the valve assembly, the two providing metal to metal contacts which are spaced apart laterally. Between the metal to metal contacts I provide packing for more efficiently sealing against leakage. This packing may be carried either by the valve proper or by the seat member 9; and in the embodiment disclosed, this packing is disposed in a groove or recess 12 extending inwardly from the face $a$ of the valve member 9. A series of inclined fluid ports or passages 13 lead from the outer periphery $b$ of the upper enlarged annular portion 11 to the groove 12. These passages are thus arranged so that when the valve 15 is seated, the pressure built up within the valve chamber 8 is transmitted through the passages 13 to force the packing into effective sealing engagement with the surface 16 of the valve proper. It will be noted that the groove 12 is arranged between the metal to metal contacts above mentioned. The general direction of flow through the cylinder which constitutes the valve seat member 9, is parallel to the direction of seating movement of the valve. The term "laterally", as employed herein to specify that the metal contacts are spaced apart laterally, is relative to this general direction. Groove 12, as illustrated, is formed with parallel straight side walls and with an inclined bottom wall, the latter being in a plane parallel with the inclined face $a$. The portion 15 is provided with depending guide members 17 and with an upwardly extending portion 18, the latter being entered in a guide sleeve 19 carried by the cap 10 in a chamber 20 thereof. Sleeve 19 is flanged at 21, and is retained in the cap by a ring 22 and headed bolts 23. 24 designates a spring disposed in the cap chamber and bears upon the upper end of portion 18 of the valve, tending to force the valve to closed position.

The packing means 25 inserted in the groove 12 and functioning to effect a seal when the valve is in closed position is designed to be maintained therein in fixed position. As shown, the insert comprises a ring made from some suitable flexible or resilient material and is substantially of diamond shape in cross section; this ring, it will be noted, has a substantially uniform inner diameter and a substantially uniform outer diameter. The insert is preferably formed with an annular groove 26 designed, when the insert is positioned in said groove, to register with the ports 13 of the seat member. Forming the insert with the groove 26 provides spaced-apart flexible portions c and d adapted to be flexed in opposite directions by the fluid introduced to the insert through the ports 13, forcing said portions into close contact and into sealing engagement with both the valve proper and the seat, this being accomplished without moving the insert bodily against the contact surface. In the present case the pressure in effect expands the insert to effect the sealing.

This construction also provides a flexible material and metal contact, and hence there is provided a metal to metal contact and a flexible material and metal contact between the seating faces of the valve and seat. The parts are arranged so that the fluid pressure may be utilized to simultaneously flex or move portions of the insert against the valve and against the seat to provide a highly efficient sealing means while retaining the body of the insert fixed.

I claim:

1. In a valve for pumps and the like, the combination with a valve seat member and a valve member, said members having metal to metal contacts spaced apart laterally, of an intermediate packing means carried by one of said members intermediate the spaced apart metal to metal contacts and arranged to contact the other member, said packing means being provided with a lateral opening for admitting pressure fluid to expand the packing means into sealing contact with the member which it engages.

2. In a valve for pumps and the like, the combination with a valve seat member and a valve member, said members having metal to metal contacts spaced apart laterally, of packing carried by one of said members intermediate the spaced apart metal to metal contacts and arranged to contact the other member, said packing having a lateral groove communicating with a passage for admitting pressure fluid for expanding the packing into sealing contact with the member which it engages.

3. A valve for pumps and the like including a valve proper, a valve seat member having a seating face extending at an angle to the direction of closing movement of the valve proper, said valve proper and seat member having metal to metal contacts spaced apart laterally, packing means carried by the seat member intermediate the metal to metal contacts and arranged to contact the valve proper, and means for permitting an internal pressure to be exerted against a marginal fraction of the contacting area of said packing means to urge said marginal fraction into contact with the valve proper.

4. A valve for pumps and the like including a valve proper, a valve seat member having a seating face extending at an angle to the direction of closing movement of the valve proper, said valve proper and seat member having metal to metal contacts spaced apart laterally, and grooved packing means carried by the seat member intermediate the metal to metal contacts said packing means having an upper surface to contact with the valve and an outer face extending downwardly therefrom, said outer face having an annular edge groove and said seat member having means to admit pressure fluid to the groove to expand a portion of the packing means into sealing contact with the valve proper.

5. A valve for pumps and the like including a valve proper, a valve chamber, a valve seat member having a seating face extending at an angle to the direction of closing movement of the valve proper, and an annular recess disposed intermediate of the face and having a fluid port leading to the recess, said recess having side walls substantially parallel to the direction of closing movement of the valve proper, and a resilient grooved insert positioned in the recess and shaped to fit the same, the groove of the insert being subjected by way of said port to the fluid pressure within the chamber to expand the insert when the valve is closed.

6. A valve seat having an annular seating surface of inverted frusto-conical curvature and an annular recess in said surface, an annular packing member filling said recess and having an exposed surface substantially in alignment with said seating surface, said packing member having an annular groove below the edges of said recess and in a plane transverse to its axis to permit the part above said groove to flex upwardly by widening said groove, and said seat having passages to said recess and in communication with said groove.

7. A valve element having an annular upwardly and outwardly inclined seating surface and an annular recess in said surface, said recess having parallel cylindrical walls, an annular packing member filling said recess and having an exposed face substantially in alignment with said seating surface, said packing member having an annular groove below the edges of said recess and in a plane transverse to its axis to permit upward flexing of the part above said groove by widening said groove, and said element having passages to said recess and in communication with said groove.

8. A valve seat having an annular seating surface of inverted frusto-conical curvature and a packing receiving recess extending downwardly therefrom and having cylindrical side walls and a packing member in said recess, said packing member comprising a solid block of resilient material having cylindrical walls fitting the side walls of said recess and a top of inverted frusto-conical shape in substantially the plane of curvature of said valve seating surface, said packing member having a groove extending inwardly from its outer cylindrical surface below the upper surface of said seat member to permit the part of said packing above said groove to swing upwardly, said seat member having openings in alignment with said groove extending from said recess to the outer face of said valve seat.

EDGAR E. GREVE.